United States Patent [19]

Baumert et al.

[11] Patent Number: 5,469,438
[45] Date of Patent: Nov. 21, 1995

[54] METHOD OF TRANSMITTING SIGNALS IN AN EXTENDIBLE LOCAL AREA NETWORK

[75] Inventors: Robert J. Baumert; Clarence C. Joh, both of Allentown, Pa.

[73] Assignee: AT&T IPM Corp., Coral Gables, Fla.

[21] Appl. No.: 188,623

[22] Filed: Jan. 28, 1994

[51] Int. Cl.⁶ ............................. H04J 3/00; H04L 12/40
[52] U.S. Cl. .................. 370/85.11; 370/85.13; 370/94.3
[58] Field of Search ................ 370/60, 60.1, 85.1, 370/85.2, 85.3, 85.9, 85.11, 85.13, 94.1, 94.3, 110.1; 340/825.02, 825.5, 825.51; 395/325, 725

[56] References Cited

U.S. PATENT DOCUMENTS

| | | | |
|---|---|---|---|
| 4,513,373 | 4/1985 | Sheets | 364/200 |
| 4,536,877 | 8/1985 | Livingston et al. | 370/85.9 |
| 4,608,685 | 8/1986 | Jain et al. | 370/85.9 |
| 4,637,015 | 1/1987 | Bobey | 370/85.11 |
| 4,674,085 | 6/1987 | Aranguren et al. | 370/85 |
| 4,787,082 | 11/1988 | Delaney et al. | 370/85 |
| 4,805,169 | 2/1989 | Van Asselt | 370/85.9 |
| 4,825,435 | 4/1989 | Amundsen et al. | 370/97 |
| 4,866,702 | 9/1989 | Shimizu et al. | 370/94.3 |
| 4,872,158 | 10/1989 | Richards | 370/58.1 |
| 4,982,400 | 1/1991 | Ebersole | 370/85 |
| 4,998,247 | 3/1991 | Irvine-Halliday et al. | 370/94.1 |
| 5,014,269 | 5/1991 | Picandet | 370/85.11 |
| 5,018,139 | 5/1991 | Despres | 370/94.3 |
| 5,041,963 | 8/1991 | Ebersole et al. | 364/200 |
| 5,043,938 | 8/1991 | Ebersole | 364/900 |
| 5,237,567 | 8/1993 | Nay et al. | 370/85.11 |

OTHER PUBLICATIONS

"Demand Priority Preliminary Draft" submitted to IEEE 802.12 by Hewlett Packard, William G. Lane, Roseville, Calif. 95747–6588, pp. 0–1–12–27.

*Primary Examiner*—Alpus Hsu
*Attorney, Agent, or Firm*—Howard A. Skaist

[57] ABSTRACT

Briefly, in accordance with one embodiment of the invention, an extendible local area network includes a hub station including a memory and at least one hub station segment. The hub station segment is adapted to be coupled to at least N other hub station segments by a bi-directional control signal bus, N being a positive integer. The hub station segment includes at least two ports, each of the ports being adapted to receive electrical signal packet transmissions from a remote station. The memory and the hub station segment are mutually coupled by a signal bus. Likewise, a method of transmitting electrical signal packets in a hub station of an extendible local area hub network includes the steps of: receiving at least one electrical signal packet at one of the ports of one of the hub station segments in the hub station from a remote station directly coupled to the one hub station segment, transmitting the at least one packet to the memory from the one hub station segment, and receiving the at least one packet at any other hub station segment substantially concurrently with the transmission to the memory, at least if the at least one packet constitutes a unicast packet.

23 Claims, 3 Drawing Sheets

5,469,438

METHOD OF TRANSMITTING SIGNALS IN AN EXTENDIBLE LOCAL AREA NETWORK

TECHNICAL FIELD

The invention relates to local area networks, such as are used, for example, in computer communications, and, more particularly, to local area hub or star-configured networks.

BACKGROUND OF THE INVENTION

Local area networks, such as are used, for example, in computer communications, are well-known and described in, for example, U.S. Pat. No. 5,041,963, entitled, "Local Area Network with an Active Star Topology Comprising Ring Controllers Having Ring Monitor Logic Function," by Ebersole, et al., issued Aug. 20, 1991; U.S. Pat. No. 4,998, 247, entitled "Active Star-Configured Local Area Network," by Irvine-Halliday, et al., issued Mar. 5, 1991; U.S. Pat. No. 4,982,400, entitled "Ring Bus Hub For a Star Local Area Network," by Ebersole, issued Jan. 1, 1991; U.S. Pat. No. 4,825,435, entitled "Multiport Repeater," by Amundsen, et al., issued Apr. 25, 1989; U.S. Pat. No. 4,872,158, entitled "Distributed Control Rapid Connection Circuit Switch," by Richards, issued Oct. 3, 1989; U.S. Pat. No. 4,787,082, entitled "Data Flow Control Arrangement For Local Area Network," by Delaney, et al., issued Nov. 22, 1988; and U.S. Pat. No. 4,674,085, entitled "Local Area Network," by Aranguren, et al., issued Jun. 16, 1987; all of the foregoing being herein incorporated by reference.

The stations or nodes of a local area network may be configured in a variety of different shapes, such as, for example, a ring or a star. In a star-configured or local area hub network, multiple discrete, remote stations are coupled through a central site or station, termed a hub station. The hub station must then follow a particular or predetermined signaling protocol to establish communications and to determine the order in which remote stations are permitted to transmit data over the network in the form of electrical signals. In one such signaling protocol, termed round robin, each of the remote stations is separately polled for transmissions. Likewise, in a round robin signaling protocol only one station may transmit electrical signal data at a time.

As disclosed and described in *Proposed Demand Priority Preliminary Draft*, submitted to IEEE 802.12 by Hewlett Packard, dated January 1994, herein incorporated by reference, a round robin protocol has been proposed to the IEEE to be employed in local area networks transmitting data at 100 megabits, termed 100 base VG. A round robin protocol provides advantages over other known network protocols, such as the protocol employed by IEEE standard 802.3, also known as CSMA/CD (Carrier Sense Multiple Access with Collision Detector), such as, for example, 10 base T, particularly for multimedia communications tasks that may be time sensitive. For such multimedia tasks or applications, it is desirable to prioritize or control the access provided remote stations to the media or communications network so that, in general, the more important communications tasks are completed earlier than the less important tasks.

For a local area hub network, it is also desirable to have the capability to increase the size of the network without substantially degrading signal transmission performance; that is, it is desirable for the network to be extendible. However, as local area hub networks increase in size, the hardware for communications between remote stations of the network becomes increasingly complex. For example, technological limitations on the manufacture of integrated circuit chips restrict the number of ports that may be fabricated on one chip. Thus, for a large local area hub network having tens or hundreds of stations, communications between remote stations directly linked or coupled to one hub station or one hub station network may need to be shared or allocated among several, discrete devices. The problem of transmitting electrical signals, typically digital signals, between the devices so that the electrical signals reach the intended remote station also becomes more complex. Thus, a need exists for a simple and reliable method of transmitting electrical signals in an extendible local area hub network.

SUMMARY OF THE INVENTION

Briefly, in accordance with one embodiment of the invention, a hub station for an extendible local area network comprises a memory and at least one hub station segment. The hub station segment is adapted to be coupled to at least N other hub station segments by a bi-directional control signal bus, N being a positive integer. The hub station segment includes at least two ports, each of the ports being adapted to receive electrical signal packets or transmissions from a remote station directly coupled or linked to the hub station segment The memory and the hub station segment are mutually coupled by a signal bus. Likewise, a method of transmitting electrical signal packets between hub station segments in a hub station for an extendible local area hub network comprises the steps of: receiving at least one electrical signal packet at one of the ports of one of the hub station segments in the hub station or hub station network from a remote station directly coupled or linked to the one hub station segment, transmitting the at least one packet to the memory from the one hub station segment, and receiving the at least one packet at any other hub station segment substantially concurrently with the transmission to the memory, at least if the packet constitutes a unicast packet.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description, when read with the accompanying drawings in which:

DETAILED DESCRIPTION

Figure 3:
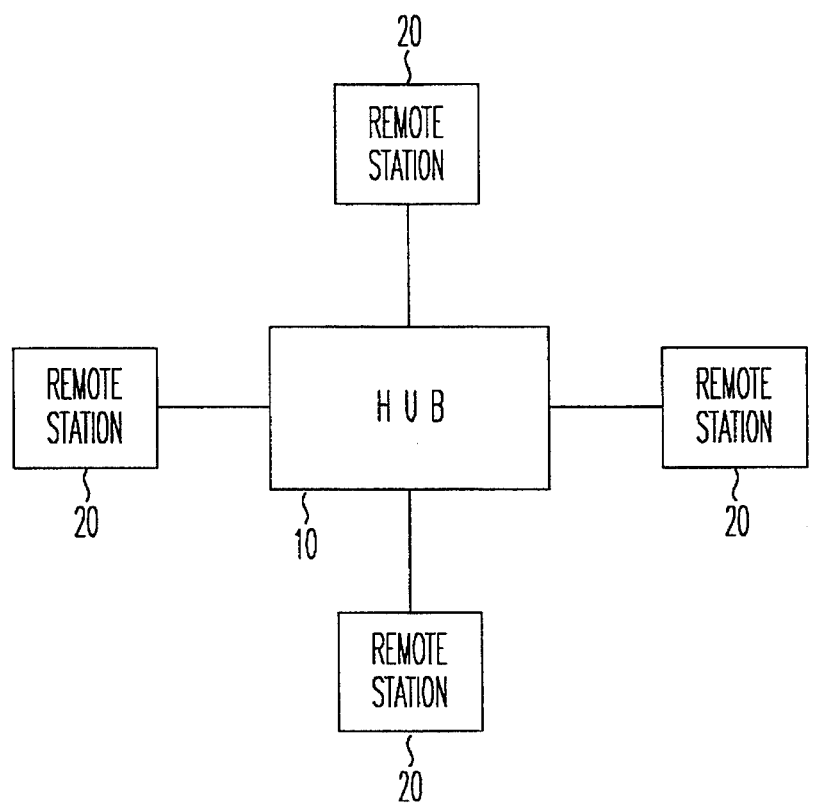
FIG. 3 is a schematic diagram of one embodiment of a conventional local area hub network.
Figure 4:
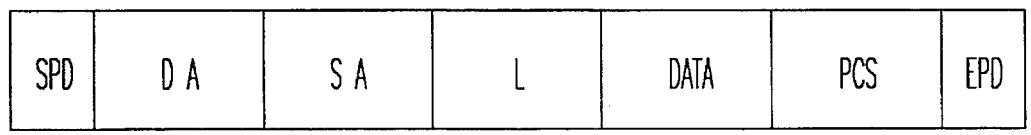
FIG. 4 is a diagram of one embodiment of an electrical signal packet that may be employed to transmit data in the form of digital signals between remote stations of an extendible local area hub network in accordance with the invention.

FIG. 3 is a schematic diagram of one embodiment of a conventional local area star-configured or hub-shaped network. As previously suggested, in a local area hub network, the stations are arranged in a star-shaped network or in a star configuration in which a central station 10 acts as a hub for the remote or other remaining stations 20 directly coupled or linked to the central station. Thus, a hub network or hub station network may be used to transmit an electrical signal packet from one remote station to another remote station or to multiple remote stations, all remote stations being in direct communication with or directly coupled to the hub station. Remote stations may comprise, for example, data terminal or other computer-related equipment, as described in the aforementioned proposed *Demand Priority Preliminary Draft*. In the context of the invention, the term electrical signal packet or transmission refers to complete and discrete groupings of data in the form of electrical signals, typically digital signals, for transmission between stations. Thus, for example, an electrical signal packet may comprise digital signals to be transmitted that are stored in a computer file at a remote station. Typically, such packets or transmissions may include a start of frame delimiter (SFD), and an end of frame delimiter (EFD). Likewise, as described on page 4-3 of the aforesaid *Proposed Demand Priority Preliminary Draft* and as illustrated in FIG. 4, a packet may further include binary digital signals or bits representing, for example, a destination address (DA), a source address (SA), the length of the packet (L), the data to be transmitted (DATA), and a frame check sequence (FCS) for signal error checking. It will be appreciated that the invention is not restricted in scope to employing the embodiment of an electrical signal packet illustrated in FIG. 4.

In the network illustrated in FIG. 3, electrical signal packets being transmitted between two remote stations must pass through hub station 10. Depending on the particular network, hub stations typically include the capability to perform and recognize a signaling protocol (often termed "hand shaking"), the capability to identify and extract data from an electrical signal packet, the capability to store data in the form of electrical signals, the capability to perform signal error checking, and the capability to perform destination address matching, such as described in the aforementioned Proposed Preliminary Draft. In a local area hub network, such as illustrated in FIG. 3, the couplings or connections of a station, particularly a hub station, may also be "bundled." In this context, bundled couplings refers to at least two couplings coupled to the ports of a station being in sufficiently close proximity to each other so that electromagnetic induction may affect the electromagnetic signal transmissions through the couplings, such as for a twisted pair of metal wires.

For a local area hub network, it may be desirable to have the capability to transmit electrical signal packets from a remote station so that the packets are received by another single, discrete, remote station, termed a "unicast" in this context. Likewise, it may be desirable to have the capability to transmit an electrical signal packet from one remote station so that the packet is received by more than one predetermined, or selected, remote station, termed a "multicast" in this context. Furthermore, it may be desirable to transmit an electrical signal packet from one remote station to all remote stations, or all the remaining remote stations, termed a "broadcast" in this context. It will now be appreciated that a broadcast packet is a particular type of multicast packet. If an electrical signal packet transmitted to the hub is to be a broadcast or a multicast, the electrical signal packet should first be stored in the hub and then further transmitted to the next station for those networks utilizing bundled couplings. Otherwise, a broadcast or multicast electrical signal packet being transmitted and received may result in "crosstalk" due to the number of couplings in close proximity with signal transmissions occurring substantially simultaneously. This "crosstalk" may degrade the quality of the signal transmissions achieved, particularly in the case of electrically conductive wires. However, after the complete electrical signal packet is stored in the hub, it may be forwarded to the designated remote stations without significant signal degradation due to crosstalk affecting the reception of the packet. Thus, a hub station should include or have access to a memory storage device with sufficient signal storage capability to store the proposed maximum length packet.

This restriction on transmission or retransmission at the hub may be omitted for a unicast packet. For a unicast packet, only one remote station should receive the packet from the hub station. Furthermore, due to the round robin protocol, only one remote station should transmit to the hub station at a time. Therefore, it may be more desirable to have the destination station for a unicast packet determined quickly and to then transmit the packet to that station without delay. Nonetheless, even for a unicast packet, the packet may not be further transmitted until a DA match has occurred, i.e., the destination remote station has been identified by the hub station. Furthermore, it is desirable if only complete electrical signal packets are transmitted. Thus, sufficient signal storage capability should exist to buffer electrical signals coming into the hub so that a DA match may be determined while electrical signals are also being processed for transmission to the next indicated station.

Another desirable aspect of a local area hub network includes the capability to expand the network. However, as previously suggested, due to limitations of integrated circuit technology, a single integrated circuit chip may accommodate only a few remote stations due to the number of ports that may be fabricated on a single chip. One approach to this problem may encompass adding additional hub chips or hub station segments that are coupled with the initial or first hub station segment to form a hub station or hub station network. Likewise, this extended network should include the capability to handle unicasts, multicasts and broadcasts without substantially degrading network performance or introducing significant additional hardware complexity. To achieve this, it may be desirable that each hub station segment include the following two signal transmission capabilities. If a unicast packet is received by a hub station segment destined for a remote station directly coupled to, or in direct communication with, another hub station segment, the capability should exist to route the electrical signal packet to at least that hub station segment. Likewise, if a broadcast or multicast electrical signal packet is transmitted to a hub station segment from a directly coupled remote station, the electrical signal packet should first be stored and then be transmitted, or retransmitted, to at least the appropriate other hub station segments substantially simultaneously.

Figure 1:
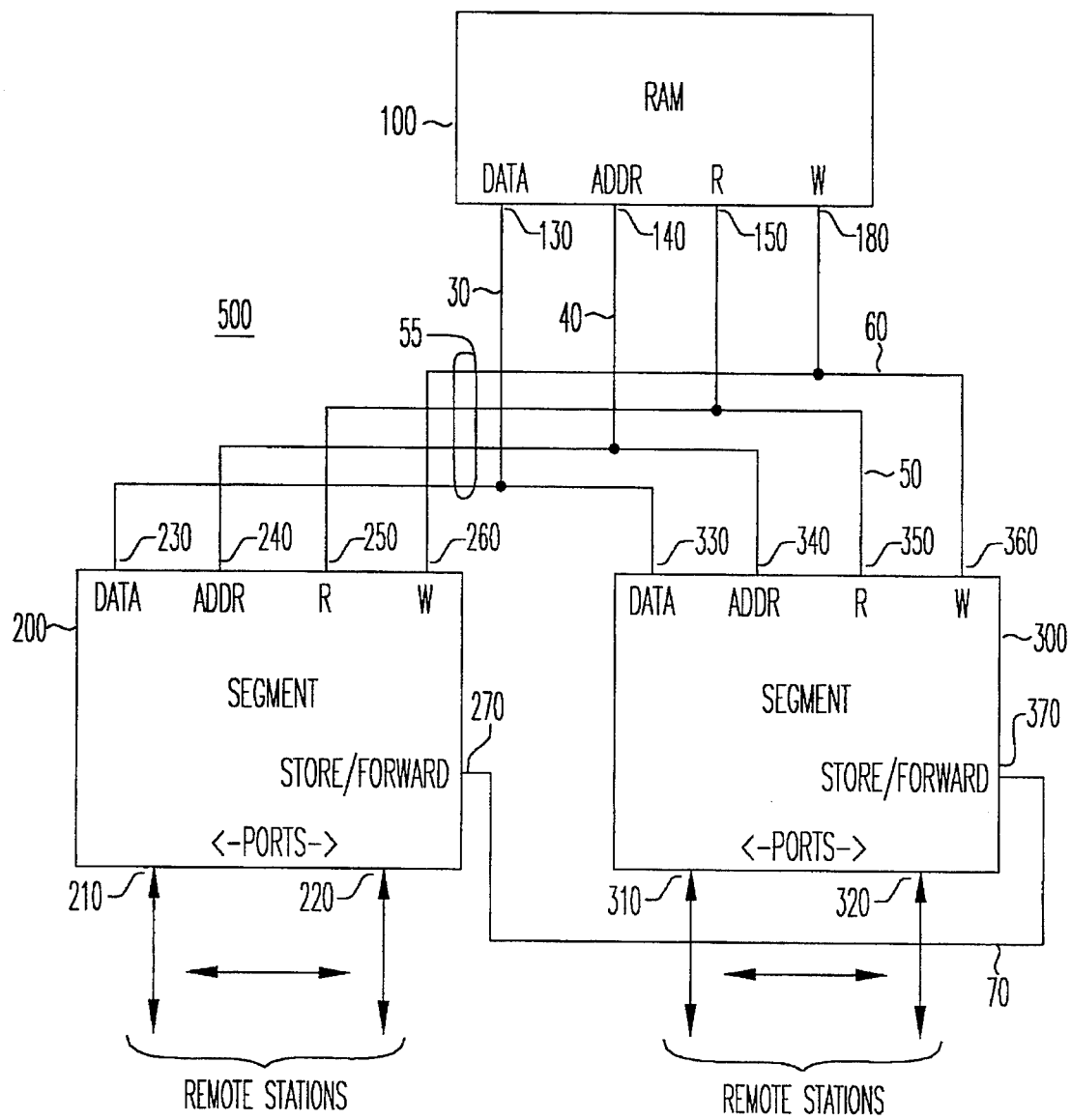
FIG. 1 is a schematic diagram of a portion of one embodiment of a hub station for an extendible local area hub network in accordance with the invention.

A portion of one embodiment of a hub station 500 for an extendible local area hub network in accordance with the invention that includes the previous capabilities is illustrated in FIG. 1. As illustrated, the hub station may comprise a conventional random access memory (RAM) unit 100 and at least one hub station segment, such as station segment 200. As illustrated, segment 200 is adapted to be coupled to at least one other substantially similar segment, such as segment 300, by a control signal bus, such as bus 70. Segment 200 includes at least two ports, such as ports 210 and 220, each of the ports being adapted to receive electrical signal packets from a remote station (not shown) directly coupled to or in direct communication with the hub segment. As illustrated, RAM unit 100 and hub station segment 200 are mutually coupled by a signal bus 55 comprising a data bus 30, an address bus 40, a RAM read signal bus 50, and a RAM write signal bus 60. As illustrated, data bus 30 couples data port 130 on RAM unit 100 to data port 230 on segment 200. Likewise, address bus 40 couples address port 140 to address port 240, bus 50 couples RAM read signal port 150 to RAM read signal port 250, and bus 60 couples RAM write signal port 160 to RAM write signal port 260. In this particular embodiment, bus 30, bus 50, bus 60 and bus 70 provide bi-directional signal paths for the mutually coupled input-output ports. Thus, as illustrated in this embodiment, hub station segment 300 is substantially similar to hub station segment 200 and has a store-forward port 370 coupled to store-forward port 270 by control signal bus 70. Likewise, segment 300 includes ports 310 and 320, respectively corresponding to ports 210 and 220, and ports 330, 340, 350 and 360 respectively corresponding to ports 230, 240, 250 and 260. Furthermore, it will now be appreciated that although only two segments are illustrated in FIG. 1, the invention is not restricted in scope to only two segments per hub station. In fact, any one of a number of N hub station segments, N being a positive integer, may be added to the hub station to further extend the extendible local area hub network illustrated in FIG. 1. As further illustrated in FIG. 1, segment 300 is mutually coupled to RAM unit 100 and segment 200 by data bus 30, address bus 40, RAM read signal bus 50, and RAM write signal bus 60.

Figure 2:
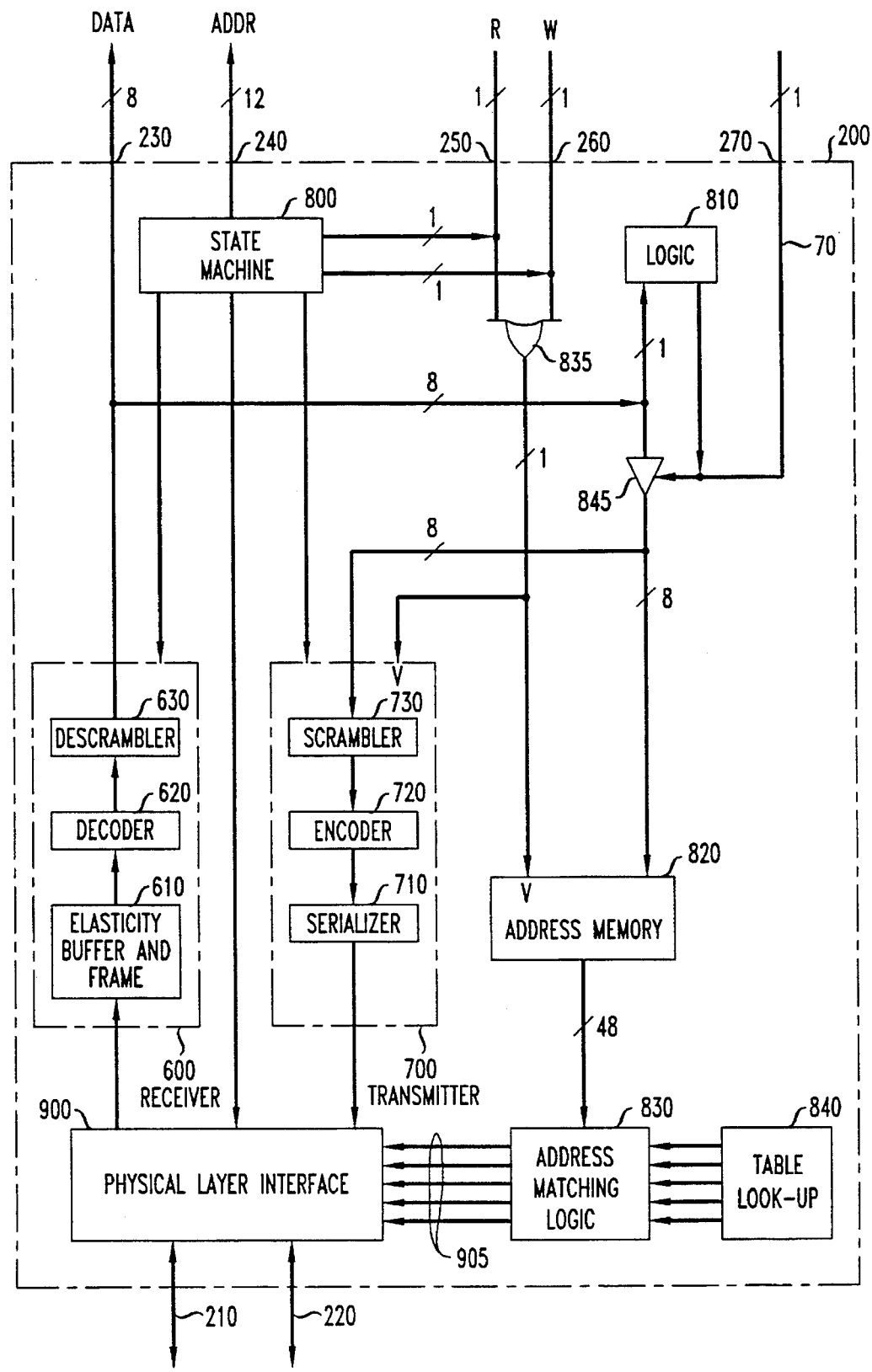
FIG. 2 is a schematic diagram of one embodiment of a hub station segment for a hub station of an extendible local area hub network in accordance with the invention.

FIG. 2 illustrates an embodiment of a hub station segment for a hub station of an extendible local area hub network in accordance with the invention in greater detail. It will be appreciated that the invention is not limited in scope to this particular embodiment. Many other alternative embodiments within the scope of the invention are possible. As illustrated, hub segment 200 includes a receiver 600 and a transmitter 700. In this particular embodiment, the receiver includes, coupled in cascade, an elasticity buffer and framer 610, a decoder 620 and a descrambler 630. Likewise, the transmitter includes, coupled in cascade, a scrambler 730, an encoder 720 and a serializer 710. As illustrated, the receiver and transmitter are both coupled to a multiport physical layer interface 900. The physical layer interface couples the hub station segment to the physical transmission medium, such as a fiber optic cable or twisted pair of metal wires. As illustrated and suggested earlier, the hub station segment and therefore physical layer interface 900 includes at least two ports. Nonetheless, due to the round robin protocol, only one of the ports is receiving data in the form of electrical signals at any given time, excluding, of course, channel signaling, such as idle tones, that may be transmitted as part of the signaling protocol, as described in the aforementioned Proposed Preliminary Draft.

Hub segment 200 further includes a controller or state machine 800. As illustrated, controller 800 monitors and controls the flow of electrical signals into and out of the hub station segment for the embodiment illustrated in FIG. 2, controller 800 accomplishes this by controlling the receiver, the transmitter, and the physical layer interface. It will be appreciated that the bi-directional buses, such as buses 30, 50, 60 in FIG. 1, may be driven by tri-state drivers controlled by controller 800. This provides one technique for achieving the bi-directional signal path input/output capability, previously described, so that a hub segment includes the capability to both send and receive electrical signal packets via the signal bus, depending on the mode of operation of the hub station segment during a particular time period. Controller 800 also controls reading to and writing from RAM unit 100, illustrated in FIG. 1, and therefore provides electrical signals, typically digital signals, to address bus 40, RAM write signal bus 60, and RAM read signal bus 50.

As illustrated, hub station segment 200 also includes in this embodiment unicast/multicast signaling logic 810, address memory unit or latch 820, address matching logic 830, typically implemented with a decoder, and table look-up memory 840, typically implemented with a pre-programmed RAM unit or other memory storage device. After the electrical signal packet received from a remote station is processed by the receiver, it may be provided to unicast/multicast signaling logic 810 in a form such as illustrated in FIG. 4. Based on the destination address (DA), typically the first or second bit of the DA as described, for example, on page 4-3 of the aforesaid Proposed Preliminary Draft, unicast/multicast signaling logic 810 may determine whether the received packet is a unicast or multicast packet. This may typically be accomplished with digital logic circuitry. As illustrated, in either case the packet is placed on data bus 30 for transmission to RAM unit 100 and the other hub station segments. However, unicast/multicast signaling logic 810 provides signals via bus 70 determining how the other hub station segments, as well as the transmit portion of hub station segment 200 illustrated in FIG. 2, handle the packet. For example, if the packet is a unicast, bus 70 may be set "high" indicating that the hub station segments forward the packet to directly coupled remote stations. Furthermore, in segment 200, gate 845, based on this forward signal received at port 270 via bus 70, enables the transfer of the packet to address memory 820 and transmitter 700. In addition, the other hub station segments include similar logic so that a forward signal on bus 70 enables receipt of the packet at the other segments via data bus 30. However, the forward signal may alteratively be a "low" signal depending on the particular embodiment.

Regardless of whether the packet is unicast or multicast, controller 800 "writes" the received packet to RAM unit 100. As mentioned, controller 800 controls the flow of signals through the segment. Thus, it includes internal memory and digital logic circuitry to accomplish this at the appropriate time via buses 40 and 50. Furthermore, as illustrated, the write signal provided to RAM unit 100 over bus 50 also provides a sequence of timing signals or pulses to enable the loading of the unicast packet into memory 820 and transmitter 700, where gate 845 has been enabled by a forward signal. Therefore, as transmitter 700 processes the packet for transmission to a remote station, address memory 820 loads the destination address. In this particular embodiment, the address is loaded into the address memory 8 bits at a time. As illustrated, address matching logic 830 also obtains input signals from table look-up memory 840 which stores the destination addresses of those remote stations directly coupled to the particular hub station segment, such as hub station segment 200 in FIG. 2. In approximately the time it takes for an address match to occur, the packet may be processed by transmitter 700. Thus, address matching logic 830 provides a signal over transmit enable bus 905 to enable the transmit portion of physical layer interface 900. In this embodiment, one signal is provided over one of the plurality of couplings to thereby enable the transmission to a remote station and, likewise, direct the output signal of transmitter 700 to the appropriate port for the selected or destination remote station. Likewise, if no match occurs then the transmission is not enabled and the packet is not forwarded to a remote station directly coupled to this particular hub station. As previously suggested, substantially simultaneous with the address matching performed in hub station segment 200, the other hub station segments are engaging in a similar process to direct the packet to the designated or selected remote station. Likewise, although for a unicast packet the controller provides signals on the address bus and RAM write signal bus resulting in storage of the packet in the RAM unit, the unicast packet is not further processed or read from the RAM unit.

In those situations where the packet received from a directly coupled remote station, such as by segment 200, is a multicast packet rather than a unicast packet, logic 810 produces a store signal, such as by setting bus 70 "low" where the forward signal is "high". The other segments are therefore signaled not to forward the packet provided over bus 30. Thus, gate 845 does not enable transfer of the packet to address memory 820 and transmitter 700. However, the controller nonetheless provides signals over buses 40 and 60 to write the packet to RAM unit 100. In the case of a multicast packet, at the end of storage in unit 100, logic 810 then provides a forward signal over bus 70. Substantially simultaneously the controller provides signals to buses 40 and 50 to read the packet just stored out of RAM unit 100. As the packet is read from RAM unit 100, the RAM read signal provided over bus 50 also provides the timing signal via logical OR gate 835 to load the destination address into address memory 820 and transmitter 700. As with a unicast packet, the "write" signal over bus 60 from controller 800 provides the pulses to load the DA into address memory 820. Now the other hub station segments receive and process the packet, as previously described.

In the embodiment illustrated in FIGS. 1 and 2, data bus 30 comprises a bi-directional 8-bit bus and address bus 40 comprises a 12-bit bus. Likewise, each of the RAM signal buses and the control signal bus comprises a bi-directional 1-bit bus. Nonetheless, the invention is not restricted in scope to buses of these particular sizes. However, while the invention is not restricted in scope to any particular-sized signal bus, cost considerations may indicate limiting the bit size of the buses employed. Furthermore, the invention,is not restricted in scope to a particular "high/low" digital signaling convention.

Typically, the RAM unit and hub station segments are implemented by discrete integrated circuit chips, although the invention is also not restricted in scope in this manner. Integrated circuit chips offer the convenience of a relatively small sized device at a relative moderate cost. As previously suggested, more than one segment is employed in those situations that require communication with a relatively large number of remote stations for a single hub station due to limitations on the number of ports for a single integrated circuit chip. Nonetheless, these network components may also be implemented with alternative technologies other than integrated circuitry, such as, for example, discrete electrical circuit components or logic gates. Furthermore, the individual hub station segments or RAM unit need not be restricted to implementation on a single integrated circuit. For these possible situations, a method of transmitting electrical signals in an extendible local area hub network in accordance with the invention may be even more desirable.

It will now be further appreciated that hub stations or hub station networks may be coupled together to extend the network further. For example, one or more bits in the destination address may be set to indicate alternative hub station networks. Furthermore, this bit or bits, may be monitored, such as by an electrical signal packet router, via the data bus. This might occur, for example, when the packet is transmitted to the RAM unit.

As illustrated in FIGS. 1 and 2, hub station 500 offers a convenient structure for transmitting electrical signal packets between hub station segments that does not exhibit excessively complex interconnecting circuitry. As illustrated in FIG. 1, external to the hub station segments only a common signal bus and a few control signals are employed. As described in more detail hereinafter, one reason for this is that the method of transmitting electrical signal packets in accordance with the invention exploits various features of the network and thereby successfully transfers electrical signal packets between hub station segments in a hub station of an extendible local area hub network. Thus, a hub station for an extendible local area hub network, such as illustrated in FIG. 1, may transmit electrical signals in accordance with the following method: at least one electrical signal packet transmitted from one of the remote stations directly coupled to one of the hub station segments, such as hub station segment 200 illustrated in FIGS. 1 and 2, may be received at one of the ports of the one hub station segment. As previously described, the at least one packet may be buffered, framed, decoded and descrambled, such as by receiver 600 in FIG. 2. The at least one received electrical signal packet is then transmitted to the RAM unit, such as RAM 100 in FIG. 1, from the one hub station, such as via bus 30 in FIG. 1. One feature of the hub station segment, such as performed by unicast/multicast signaling logic 810, is the capability to identify whether the received electrical signal packet is a unicast packet, a multicast packet, or a broadcast packet. Thus, the step of receiving an electrical signal packet may include determining if the packet constitutes a unicast packet. As described, this may be accomplished by verifying a bit in the destination address of the packet. If the packet constitutes a unicast packet, then the packet transmitted to the RAM unit is received by any other or remaining hub station segments from the data bus substantially concurrently with transmission to the RAM unit. As previously described, this is accomplished by transmitting a forward signal over bus 70. Otherwise, although the packet is transmitted over data bus 30, it is not received at the other hub station segments.

A method of transmitting electrical signals in an extendible local area hub network in accordance with the invention therefore has the desirable attribute of reducing the complexity of signaling between hub station segments and the associated digital circuitry by exploiting a signal bus coupling the hub station segments with the RAM unit. For example, employing a signal bus mutually coupling the RAM and hub stations, as previously described, reduces the complex signaling and circuitry that would typically be needed for signals to first be received by the RAM unit and then be retransmitted from the RAM unit or, alternatively, be needed for signals to be received and transmitted between various hub station segments. Likewise, a FIFO memory unit or similar memory-stacking device and other digital logic circuitry might otherwise be required to store all of the network destination addresses and to perform destination address matching in addition to transmitting the signals. However, as previously described, the circuitry employed to forward a packet from a hub station segment to a local remote station, that is a remote station directly coupled to that particular hub station segment, is also utilized for those packets received by a hub station segment via the data bus from other hub station segments. Furthermore, a round robin signaling protocol, such as previously described, permitting only one station to transmit over the network at a time, enhances the opportunities to exploit the advantages presented by a shared signal bus in the manner previously described.

Depending upon the particular network there may be one other hub station segment or several other hub station segments. Where the network includes at least one other hub station segment, the step of receiving the unicast packet via the databus at any other hub station segment includes receiving the packet at least at the one other hub station segment via the databus. Likewise, where the network includes more than at least one other hub station segment, then the receiving step may include receiving the packet at all of the hub station segments via the databus or all of the other hub station segments via the databus. As previously described, each of the hub station segments or the other hub station segments may then separately determine whether the electrical signal packet constitutes a local electrical signal packet.

In general, as previously described, at each segment, the packet received via the data bus is handled like a packet received from a remote station directly coupled to the segment after the packet has been processed by the receiver, such as receiver 600. If address matching logic 830 finds a DA match, the packet is forwarded or transmitted to the destination remote station directly coupled to the segment. As previously suggested, locating this local forwarding operation at the hub station segment receiving the packet over the data bus rather than the hub station segment transmitting the packet over the data bus avoids circuitry to store destination addresses, perform memory stacking, and perform memory address matching. Thus, each hub station segment receiving the electrical signal packet over the data bus may separately determine, using internal circuitry at each segment, as described, whether the electrical signal packet should be further transmitted to a remote station directly coupled to that particular hub station segment. The electrical signal packet is scrambled, encoded, and serialized, as previously suggested. The processed packet is then transmitted to the coupled remote station if an address match occurs, as described. If not, then the electrical signal packet is not further transmitted at the particular receiving hub station segment.

A similar technique may be employed where an electrical signal packet constitutes a multicast packet rather than a unicast packet. Thus, like the unicast packet, the hub station segment, such as segment 200 in FIG. 1, receiving an electrical signal packet from the originating, directly coupled, remote station, may determine if the packet constitutes a multicast packet, as previously described. If the packet constitutes a multicast packet, the packet is transmitted to the RAM unit and stored, but is not substantially concurrently received by the other hub station segments. As described for the embodiment in FIG. 2, this may be accomplished by signaling the other hub segments, such as over bus 70. The multicast packet is then read from the RAM unit by the hub station segment that "wrote" or stored the packet in the RAM unit. All the hub station segments or, alternatively, all the other hub stations, then receive the packet via the data bus as it is read from the RAM unit, after storage in the RAM unit. Again, for the embodiment in FIG. 2, signaling to the other hub station segments to forward the packet may be accomplished via bus 70, as previously described.

This technique provides the capability to achieve a multicast or broadcast to the selected hub station segments substantially simultaneously while avoiding the problems associated with "bundled" couplings. Thus, introducing this relative short delay in transmission, associated with transmission to the RAM unit followed by transmission from the RAM unit, for a multicast or broadcast packet, satisfies the constraint of nonsimultaneous transmission and reception of the packet at the hub station segment ports while also avoiding timing and signaling problems that might otherwise arise in transmitting electrical packets between multiple hub station segments.

Next, for a multicast or broadcast packet, each of the hub station segments determine, as before, whether the electrical signal packet constitutes a local electrical signal packet, again exploiting the benefits of the structure and approach previously described. Thus, for the embodiment illustrated in FIG. 2, the packet received at all the hub station segments, or all of the other segments, via bus 30 is provided to the address memory and transmitter of the hub station segments for further processing. However, for a multicast or broadcast electrical signal packet, in contrast with a unicast packet, the electrical signal packet may constitute a local electrical signal packet for more than one hub station segment.

As described, electrical signal transmission among discrete devices in a hub station for a large and complex local area hub network may be accommodated in accordance with the invention with only a mutually shared signal bus and a few control signals. While only certain features of the invention have been illustrated and described herein, many modifications, substitutions, changes or equivalents will now occur to those skilled in the art. It is therefore, to be understood that the appended claims are intended to cover all such modifications and changes as fall within the true spirit of the invention.

We claim:

1. An extendible round robin local area hub network, said network comprising a hub station;

said hub station including a random access memory (RAM) unit and at least one hub station segment;

said at least one hub station segment being adapted to be coupled to at least N other hub station segments by a bidirectional control signal bus, N being a positive integer;

said at least one hub station segment including at least two ports, each of said ports being adapted to receive electrical signal packets from a remote station directly coupled to said at least one hub station segment;

said RAM unit and said at least one hub station segment being mutually coupled by a signal bus;

said signal bus mutually coupling said RAM unit and said at least one hub stationsegment comprising a bi-directional data bus, an address bus, a bi-directional RAM read signal bus, and a bi-directional RAM write signal bus.

2. The network of claim 1, wherein said at least N other hub station segments are substantially similar to said at least one hub station segment.

3. The network of claim 1, wherein said data bus comprises an 8-bit bus, said address bus comprises a 12-bit bus, said control signal bus, said RAM read signal bus and said RAM write signal bus each comprises a 1-bit bus.

4. The network of claim 1, wherein said RAM unit and said at least one hub station segment each comprises an integrated circuit chip.

5. The network of claim 1, wherein said at least one hub station segment is adapted to recognize a unicast electrical signal packet received from one of the remote stations directly coupled to said at least one hub station segment.

6. The network of claim 5, wherein said at least one hub station segment is adapted to forward a unicast packet received via said data bus to one of said ports.

7. The network of claim 1,
wherein said at least one hub station segment is adapted to recognize a multicast electrical signal packet received from one of the remote stations directly coupled to said at least one hub station segment.

8. The network of claim 7, wherein said at least one hub station segment is adapted to forward a multicast packet received via said data bus to one of said ports.

9. A method of transmitting electrical signal packets in an extendible local area hub network;

said network comprising a hub station including at least a memory and two hub station segments;

each of said hub station segments being mutually coupled by a control signal bus and including at least two ports, each of said ports being adapted to receive electrical signal packets from a remote station directly coupled to the hub station segment;

said memory and said hub station segments being mutually coupled by a data bus, an address bus, a memory read signal bus, and a memory write signal bus;

said method comprising the steps of:

receiving at least one electrical signal packet at one of the ports of one of said hub station segments from one of the remote stations directly coupled to the one of said hub station segments; and transmitting the at least one packet to said memory from the one of said hub station segments; and receiving the at least one packet at any other hub station segment substantially concurrently with transmission to said memory, at least if said at least one packet constitutes a unicast packet.

10. The method of claim 9, wherein the step of transmitting the at least one packet to said memory comprises transmitting the at least one packet via said data bus.

11. The method of claim 10, wherein the step of receiving the at least one packet at any other hub station segment comprises receiving the at least one packet via said data bus.

12. The method of claim 11,
and further comprising the step of, for said any other hub station segment, determining whether the electrical signal packet constitutes a local electrical signal packet.

13. The method of claim 11, wherein said network comprises at least one other hub station segment in addition to said two hub station segments;

wherein the step of receiving from one of the remote stations directly coupled to the one of said hub station segments includes determining if the at least one packet constitutes a multicast packet; and further comprising the step of:

reading the at least one packet from said memory to all other hub station segments via said data bus if said packet constitutes a multicast packet.

14. The method of claim 13, wherein said multicast packet constitutes a broadcast packet.

15. The method of claim 13, wherein the step of reading comprises reading the at least one packet from said memory to all hub station segments via said data bus if said packet constitutes a multicast packet.

16. The method of claim 15, wherein said multicast packet constitutes a broadcast packet.

17. The method of claim 15, and further comprising, for said all hub station segments, determining whether the electrical signal packet constitutes a local electrical signal packet.

18. The method of claim 13, and further comprising, for said all other hub station segments, determining whether the electrical signal packet constitutes a local electrical signal packet.

19. The method of claim 9, wherein the step of receiving from one of the remote stations directly coupled to the one of said hub station segments includes determining if the at least one packet constitutes a unicast packet.

20. The method of claim 19, wherein said hub station comprises at least one other hub station segment in addition to said two hub station segments;

wherein the step of receiving at any other hub station segment comprises receiving the at least one packet at said at least one other hub station segment.

21. The method of claim 20, wherein the step of receiving at any other hub station segment comprises receiving the at least one packet at all other hub station segments.

22. The method of claim 21, wherein the step of receiving at any other hub station segment comprises receiving the at least one packet at all hub station segments.

23. The method of claim 9,
wherein said memory and said hub station segments, each comprises an integrated circuit chip;

wherein said method comprises the steps of:

receiving at least one electrical signal packet at one of the ports of one of said hub station segment integrated circuit chips from one of the remote stations directly coupled to the one of said hub station segment integrated circuit chips;

transmitting the at least one packet to said memory integrated circuit chip from the one of said hub station segment integrated circuit chips; and receiving the at least one packet at any other hub station segment integrated circuit chip substantially concurrently with transmission to said memory integrated circuit chip, at least if said at least one packet constitutes a unicast packet.

* * * * *